Feb. 11, 1941.  E. HASSIG  2,231,469
CUTTING TOOL
Filed April 23, 1938
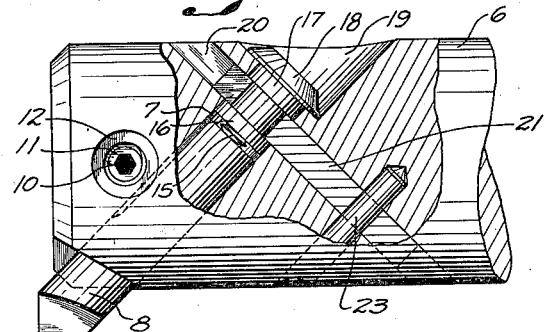
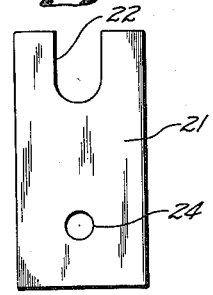
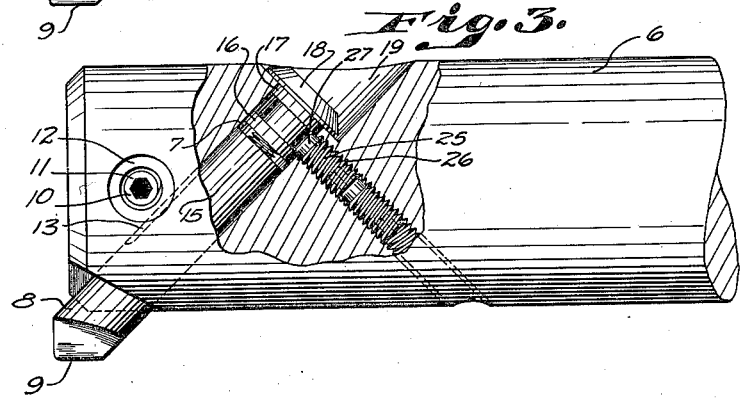
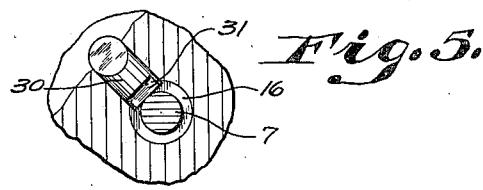
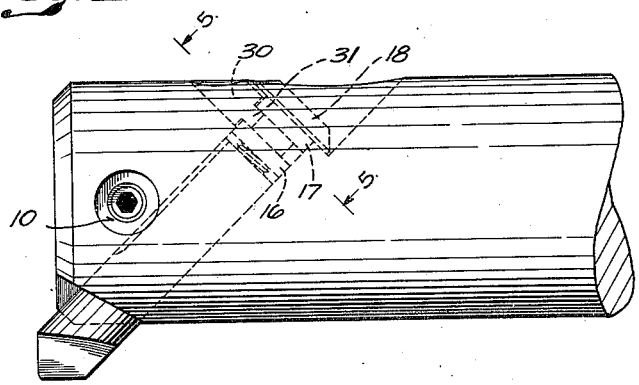
INVENTOR
Edward Hassig
BY
Wheeler, Wheeler and Wheeler
ATTORNEY Patented Feb. 11, 1941

2,231,469

UNITED STATES PATENT OFFICE 2,231,469

CUTTING TOOL

Edward Hassig, Milwaukee, Wis., assignor to Wetmore Reamer Company, Milwaukee, Wis., a corporation of Wisconsin Application April 23, 1938, Serial No. 203,774

3 Claims. (Cl. 77—58)

This invention relates to improvements in cutting tools, with particular reference to boring bars.

As in my companion application executed of even date herewith and having a like title, it is broadly the object of the invention to provide improved means for fixing with reference to a tool body, the position of a screw by means of which the projection of a cutting element from said body may be adjusted accurately and without back lash.

More particularly stated, it is one of the objectives of the present invention to provide a construction whereby the integral head of an adjusting screw may be provided with an anchorage device fixed in a cross bore within said body in an arrangement such as to permit the accurate machining of the complementary thrust surfaces of the anchorage device and the screw head, notwithstanding the preferred integral construction of the latter.

Other objects of the invention will appear in more detail from the following disclosure.

In the drawing:

Figure 1 shows partially in side elevation and partially in axial section, a tool construction embodying this invention.

Figure 2 is a detail view in plan of the anchorage device shown embodied in the tool of Figure 1.

Figure 3 is a view similar to Figure 1 showing a modified embodiment of the invention.

Figure 4 is a view of a further modified embodiment of the invention as it appears in side elevation.

Figure 5 is a detail fragmentary view taken in section on the line 5—5 of Figure 4.

Like parts are identified by the same reference numbers throughout the several views.

The devices herein disclosed represent developments of a rotary cutting tool disclosed in my previous Patent No. 2,096,489. In the present device, as in the patented construction, it is possible to secure the graduated adjustment of a tool element inwardly and outwardly without back lash.

In the present construction the tool body is shown at 6. It is provided at 7 with a bore which, in this instance, is inclined with reference to the axis of the body to project from the body through the corner thereof. In this bore the tool element 8 is adjustably reciprocable whereby its cutting edge 9 is moved to and from the central axis of the boring bar of tool body 6. The position of the tool element may be fixed at will either by means of the locking device disclosed in my aforesaid Patent No. 2,096,489, or by means of a wedge lock 10 including a screw 11 controlling a wedge 12 bearing on the flattened surface 13 of the tool element 8 to restrain it at all times from rotation and, when tightened, to fix its axial position as well. The construction of such a wedge lock is disclosed more particularly in the patent to Schmidt No. 2,096,472.

The tool element 8 has a tapped opening with which the adjusting screw 15 is in threaded engagement. This screw has an integral screw-shaped head including spaced annular flanges 16 and 17, the latter of which is preferably provided with a suitably calibrated dial 18 disposed within the counterbore 19 with its beveled surface substantially flush with the periphery of the bar 6 to facilitate manipulation.

The opposed flat surfaces of the flanges 16 and 17 of the screw head are accurately machined to receive the anchorage means now to be described. In each instance the anchorage means is preferably located within a bore of the body which intersects the bore 7 in which the tool element 8 is reciprocable.

In the construction shown in Fig. 1 the intersecting opening 20 is so formed as to receive the flat plate 21, the thickness of which is accurately determined by careful machining to correspond exactly to the spacing between flanges 16 and 17 of the screw head. A notch in the plate at 22 receives that portion of the screw head between the flanges, and a pin at 23 is driven into an opening of the body 6 and through a hole 24 of the plate to secure the plate permanently within the body, whereby the plate constitutes means accurately fixing the position of the screw head to enable the screw to be rotated without any back lash or axial displacement of any kind.

In the construction shown in Fig. 3 the anchorage device comprises a plug 25 in a screw threaded bore 26 formed within the body to intersect the bore 7 within which the tool element 8 is reciprocable. Beyond its screw threaded portion the plug 25 has a reduced bearing portion 27 accurately machined to a diameter exactly corresponding to the spacing between the flanges 16 and 17 of the screw head, thereby fixing the screw head against axial displacement while permitting it freedom of rotation.

In the construction shown in Fig. 4 and Fig. 5 the anchorage device comprises a plug 30 which happens to be inserted in the tool body from the opposite side of the movable tool element, the direction of insertion being immaterial in any case. In this instance the plug 30 has a terminal key portion 31 so flattened as to provide parallel surfaces accurately fitted between the flanges 16 and 17 of the screw head.

In each instance the bore in which the intersecting device is located is preferably at right angles to the bore in which the tool element reciprocates, thereby facilitating the accurate production of opposed bearing surfaces complementary to those of the screw head.

I claim:

1. In a device of the character described, the combination with a tool element, a tool body having a bore for said element and a transverse opening intersecting said bore substantially at right angles, of an adjusting screw in threaded connection with said element and provided adjacent said opening with a head having an annular channel aligned with said opening, and an anchoring device seated in said opening within said body and comprising a flat plate having a terminal portion substantially equal in thickness to the width of said channel and notched to fit within said channel about said head.

2. In a device of the character described, the combination with a tool element and a tool body having a bore in which said element is reciprocable, and having a transverse slot intersecting said bore substantially at right angles, of an adjusting screw in threaded connection with said element and provided adjacent said opening with a head annularly channeled to provide a reduced portion and shoulders at either side thereof, and an anchorage device seated in said opening and comprising a plate having a notched terminal portion fitted about the reduced portion of said head and between said shoulders.

3. In a device of the character described, the combination with a tool element and a tool body having a bore in which said element is reciprocable and having a transverse slot intersecting said bore substantially at right angles, of an adjusting screw in threaded connection with said element and provided adjacent said slot with a head annularly channeled to provide a reduced portion and shoulders at each side thereof, an elongated plate disposed in said slot and having a bifurcated terminal portion adapted to fit about said reduced portion, and pin means anchored in said body portion to project through said plate at a point spaced from the bifurcated terminal, whereby to anchor the plate in engagement with the reduced screw portion.

EDWARD HASSIG.